No. 843,591. PATENTED FEB. 12, 1907.
R. J. EDWARDS.
SPRING BEARING.
APPLICATION FILED JULY 12, 1906.
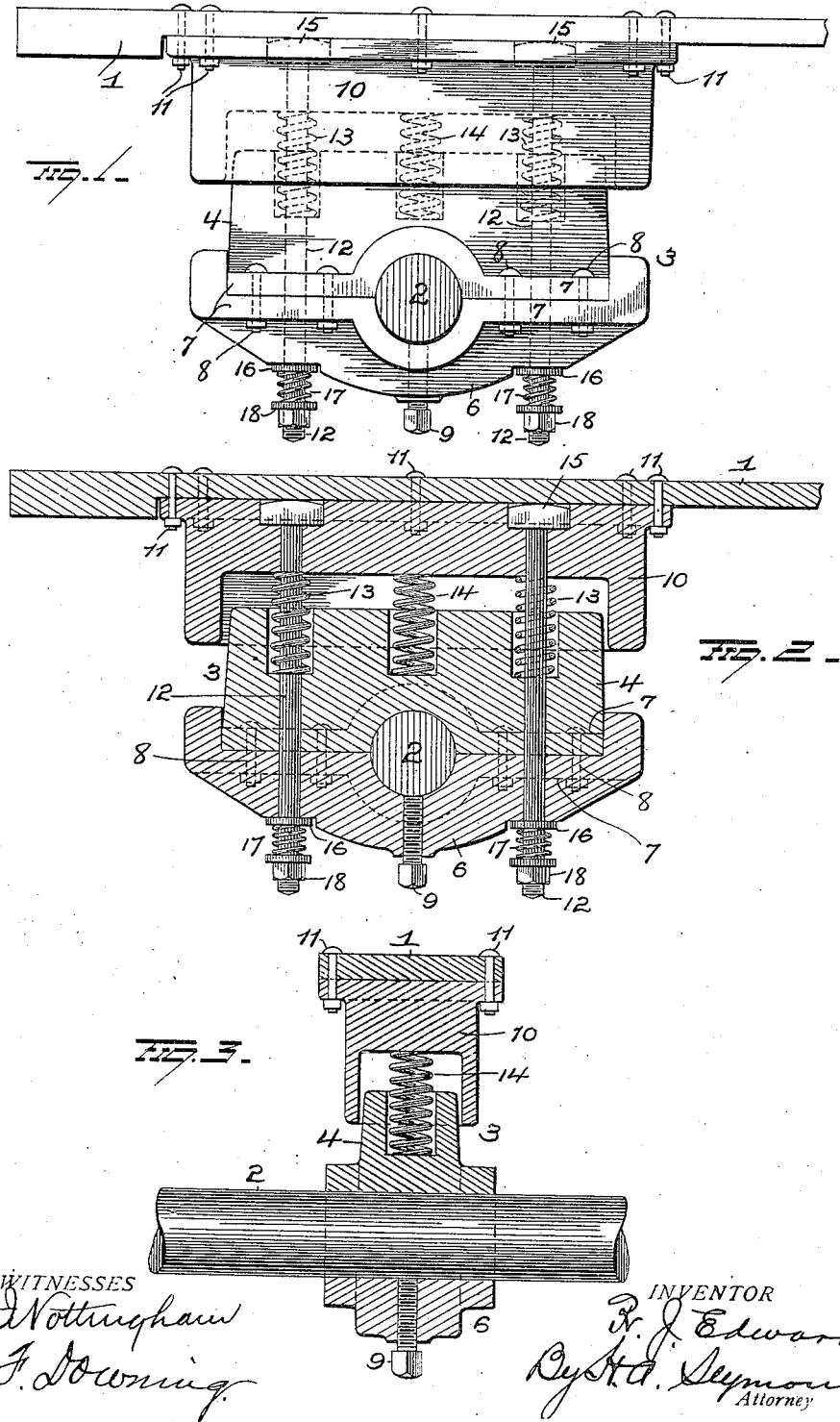

 UNITED STATES PATENT OFFICE.

RICHARD JAMES EDWARDS, OF GALENA, ILLINOIS.

SPRING-BEARING.

No. 843,591.      Specification of Letters Patent.      Patented Feb. 12, 1907.

Application filed July 12, 1906. Serial No. 325,927.

*To all whom it may concern:*

Be it known that I, RICHARD JAMES EDWARDS, a resident of Galena, in the county of Jo Daviess and State of Illinois, have invented certain new and useful Improvements in Spring-Bearings; and I do hereby declare the following to be a full, clear, and exact description of the invention, such as will enable others skilled in the art to which it appertains to make and use the same.

My invention relates to an improved spring-bearing particularly designed for use on motor-vehicles, but also adapted for use on various other vehicles, the object of the invention being to provide an improved spring-bearing to elastically support the vehicle-body and mechanism carried thereby which will dispense with the necessity for elliptical and other springs now in use; and the invention consists in certain novel features of construction and combinations and arrangements of parts, as will be more fully hereinafter described, and pointed out in the claims.

In the accompanying drawings, Figure 1 is a view in elevation, illustrating my improvements; and Figs. 2 and 3 are views in section through the bearing at right angles to each other.

1 represents the underframe of a motor or other vehicle, 2 the axle, and 3 my improved spring-bearing interposed between the frame 1 and axle 2 to take the place of the ordinary elliptical or other spring.

The spring-bearing 3 comprises a block 4, having a half-bearing in its lower face to receive the axle 2, and a similar half-bearing block 6 is located below the axle and is recessed to receive block 4. Both of said blocks 4 and 6 are made with flanges 7 to receive securing-bolts 8, passed through alined holes in the flanges 7 to secure the blocks together on the axle. A set-screw 9 is preferably located in the half-bearing portion of block 6 to engage axle 2 and secure the blocks thereto.

10 represents a cap-block having a flanged upper end to receive securing-bolts 11, securing the cap-block to the frame 1. This cap-block 10 fits over block 4 and moves thereon, and bolts 12 are passed through cap-block 10 and blocks 4 and 6 adjacent to the ends of the bearing, and coiled springs 13 are located around said bolts between the cap-block 10 and block 4 and housed in recesses in the latter, and a similar spring 14 is located at the center of the bearing and housed in a recess in the central portion of block 4, as clearly shown in Fig. 2. Heads 15 at the upper ends of bolts 12 are countersunk into the top of cap-block 10, and on the lower screw-threaded ends of these bolts 12, which project below block 6, washers 16, coiled springs 17, and nuts 18 are located to cushion the upward movement of the frame or rebound of the spring-bearing, as will more fully hereinafter appear.

These spring-bearings, which may be located at the corners of the frame at the center of the axles or elsewhere, as may be desired, serve to perfectly cushion the vehicle-frame and maintain the body approximately level regardless of the up-and-down movement of the wheels on an uneven road, and when the bearing is compressed, due to any jar, the springs 17 at the bottom cushion the rebound and prevent jar to the vehicle, due to sudden stopping of the upward movement of the body, as is the case with vehicles now in use.

These bearings may be employed on any character of vehicle and take the place of the ordinary elliptical and other springs, decreasing the cost of the vehicle and reducing the weight thereof and at the same time increasing the durability and strength of the vehicle, not to mention the comfort of the user.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A spring-bearing for vehicles comprising two blocks having recesses to receive an axle, means securing said blocks together, a cap-block, rods or bolts passing through all of said blocks, springs between the cap-block and the upper of the first-mentioned blocks, nuts on the lower ends of said bolts, and springs on the bolts between said nuts and the lower ends of the first-mentioned blocks.

2. A spring-bearing for vehicles, comprising a block, a cap-block having telescopic relation thereto, bolts passing through said blocks, springs between the blocks and springs on the bolts below the lower block.

3. A spring-bearing for vehicles, comprising two blocks having bearings for an axle, each of said blocks provided with flanges, fastening devices passing through said flanges, a cap-block, bolts passing through the cap-block and the first-mentioned blocks, springs interposed between said cap-block and the upper of the first-mentioned blocks, nuts on said bolts and springs on the bolts between said nuts and the lower block.

4. In a bearing for vehicles, the combination of a block having a recess in its top, another block seated in said recess, each of said blocks having a recess to receive an axle, means for securing said blocks together, a cap-block, rods or bolts passing through the cap-block and the first-mentioned blocks, nuts on the bolts, springs on the lower ends of the bolts, springs between said nuts and the lower block, and springs between the cap-block and the upper of the first-mentioned blocks.

5. A spring-bearing for vehicles, comprising a block having an axle half-bearing in its bottom, a block secured to the bottom of the first-mentioned block and having an axle half-bearing in its top, a cap-block movable on the first-mentioned block, a vehicle-frame to which said cap-block is secured, headed bolts passed through all of said blocks, springs around the bolts between the cap-block and upper block, a third spring between the blocks, and springs on the lower ends of the bolts to cushion the rebound.

In testimony whereof I have signed this specification in the presence of two subscribing witnesses.

RICHARD JAMES EDWARDS.

Witnesses:
JOHN J. JONES,
PAUL KERZ.